United States Patent
Rannow

(10) Patent No.: US 9,933,328 B2
(45) Date of Patent: Apr. 3, 2018

(54) METHOD FOR DETECTING A BURST HOSE IN A HYDRAULIC SYSTEM

(71) Applicant: EATON CORPORATION, Cleveland, OH (US)

(72) Inventor: Michael Berne Rannow, Eden Prairie, MN (US)

(73) Assignee: Eaton Intelligent Power Limited (IE)

(*) Notice: Subject to any disclaimer, the term of this patent is extended or adjusted under 35 U.S.C. 154(b) by 61 days.

(21) Appl. No.: 14/910,735

(22) PCT Filed: Aug. 8, 2014

(86) PCT No.: PCT/US2014/050315
§ 371 (c)(1),
(2) Date: Feb. 8, 2016

(87) PCT Pub. No.: WO2015/021366
PCT Pub. Date: Feb. 12, 2015

(65) Prior Publication Data
US 2016/0187221 A1   Jun. 30, 2016

Related U.S. Application Data

(60) Provisional application No. 61/864,198, filed on Aug. 9, 2013.

(51) Int. Cl.
*G01M 3/26* (2006.01)
*G01M 3/28* (2006.01)
*G01F 1/36* (2006.01)

(52) U.S. Cl.
CPC ........ *G01M 3/2815* (2013.01); *G01M 3/2807* (2013.01); *G01F 1/36* (2013.01)

(58) Field of Classification Search
CPC ............ G01M 3/00; G01M 3/26; G01M 3/28; G01M 3/2807; G01M 3/2815; G01F 1/36
See application file for complete search history.

(56) References Cited

U.S. PATENT DOCUMENTS 3,233,447 A   2/1966 Horrell
4,522,109 A   6/1985 Marchi et al.
(Continued)

FOREIGN PATENT DOCUMENTS

DE   102 38 199 A1   3/2004
JP   2011012746 A * 1/2011  ............ F15B 19/005
(Continued)

OTHER PUBLICATIONS

International Search Report for corresponding International Patent Application No. PCT/US2014/050315 dated Nov. 20, 2014.
(Continued)

*Primary Examiner* — Nguyen Ha
(74) *Attorney, Agent, or Firm* — Merchant & Gould P.C.

(57) ABSTRACT

A system and method for detecting a leak in a hose of a hydraulic system having a control valve assembly with first and second work ports in fluid communication with an actuator is disclosed. In one aspect, the method includes estimating a first hydraulic fluid flow rate for fluid flowing from the control valve assembly first work port to the actuator. Another step may be estimating a second hydraulic fluid flow rate for fluid flowing from the actuator to the control valve assembly second work port. In one step, a proportional flow rate difference is calculated between the first and second hydraulic fluid flow rates. Subsequently, a flow error value can be calculated by subtracting the flow rate difference from a predetermined margin value. Where the flow error value integrated over time exceeds a total flow error threshold value, a hydraulic fluid leak signal can be generated.

20 Claims, 10 Drawing Sheets

(56) References Cited

U.S. PATENT DOCUMENTS

| | | | |
|---|---|---|---|
| 4,892,114 A | 1/1990 | Maroney et al. | |
| 5,187,973 A | 2/1993 | Kunze et al. | |
| 5,272,646 A | 12/1993 | Farmer | |
| 5,461,903 A * | 10/1995 | Harms | F15B 20/005 340/605 |
| 5,497,653 A | 3/1996 | Snow | |
| 5,748,077 A * | 5/1998 | Brandt | B60T 11/323 340/450 |
| 6,263,842 B1 | 7/2001 | De Ojeda et al. | |
| 6,663,349 B1 | 12/2003 | Discenzo et al. | |
| 6,696,960 B1 | 2/2004 | Martinez | |
| 7,562,554 B2 | 7/2009 | Yoo et al. | |
| 8,239,069 B2 | 8/2012 | Yuan et al. | |
| 8,749,393 B1 * | 6/2014 | Tollefson | G01M 3/2876 137/460 |
| 2005/0022589 A1 | 2/2005 | Du | |
| 2005/0234660 A1 | 10/2005 | Kambli et al. | |
| 2007/0028674 A1 | 2/2007 | Beiderman et al. | |
| 2008/0223111 A1 | 9/2008 | McDonald et al. | |
| 2009/0242705 A1 | 10/2009 | Cros et al. | |
| 2012/0232756 A1 | 9/2012 | Yuan et al. | |
| 2014/0099212 A1 | 4/2014 | Dybing et al. | |

FOREIGN PATENT DOCUMENTS

| | | |
|---|---|---|
| WO | 2008/003352 A1 | 1/2008 |
| WO | 2013/040296 A2 | 3/2013 |

OTHER PUBLICATIONS

Extended European Search Report for corresponding European Patent Application No. 14833989.8 dated Mar. 6, 2017, 10 pages.

* cited by examiner

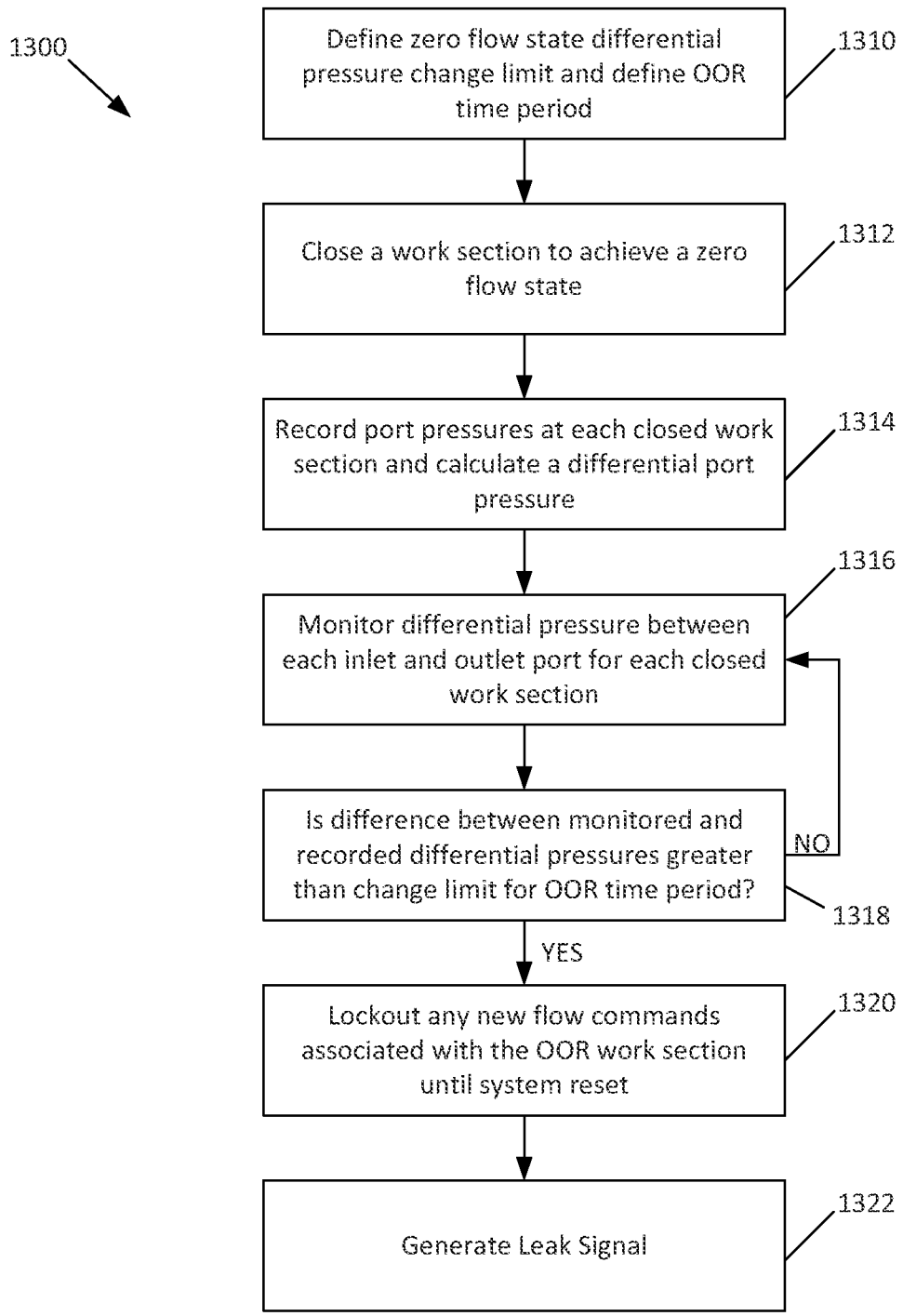

METHOD FOR DETECTING A BURST HOSE IN A HYDRAULIC SYSTEM

CROSS-REFERENCE TO RELATED APPLICATION(S)

This application is a National Stage of PCT/US2014/050315, filed on 8 Aug. 2014, which claims benefit of U.S. Patent Application Ser. No. 61/864,198 filed on Aug. 9, 2014 and which applications are incorporated herein by reference. To the extent appropriate, a claim of priority is made to each of the above disclosed applications.

BACKGROUND

Work machines, such as fork lifts, wheel loaders, track loaders, excavators, backhoes, bull dozers, and telehandlers are known. Work machines can be used to move material, such as pallets, dirt, and/or debris. The work machines typically include a number of work circuits configured to carry out various functions of the work machine. For example, a work machine may have a work circuit for lifting and lowering a work implement and another work circuit for causing the work implement to rotate. The work circuits are typically powered by a hydraulic system including a hydraulic pump powered by a prime mover, such as a diesel engine. It is not uncommon for a valve or hose within the hydraulic system to develop a leak. Where a significant loss of hydraulic fluid is lost due to such a leak, a complete loss of system functions can occur. Improvements for detecting the occurrence of a leak are desired.

SUMMARY

A method for detecting a leak in a hose of a hydraulic system having a control valve assembly with first and second work ports in fluid communication with an actuator is disclosed. In one aspect, the method includes implementing a first leak detection protocol including the step of estimating a first hydraulic fluid flow rate for fluid flowing from the control valve assembly first work port to the actuator. Another step in the protocol may be estimating a second hydraulic fluid flow rate for fluid flowing from the actuator to the control valve assembly second work port, in one embodiment, a twin spool valve is used wherein the step of estimating a first hydraulic fluid flow rate includes estimating the first hydraulic fluid flow rate for fluid flowing between a first stage of the control valve assembly and the actuator via the first work port and the step of estimating a second hydraulic fluid flow rate includes estimating the second fluid flow rate for fluid flowing between a second stage of the control valve assembly and the actuator via the second work port.

In one step of the protocol, a proportional flow rate difference is calculated between the first and second hydraulic fluid flow rates. Subsequently, a flow error value can be calculated by subtracting the flow rate difference from a predetermined margin value. Where the flow error value integrated over time exceeds a total flow error threshold value, a hydraulic fluid leak signal can be generated.

A hydraulic system having leak detection capabilities is also disclosed. In one aspect, the system includes a hydraulic circuit including a fluid actuator and a control valve assembly having first work port in fluid communication with the actuator and a second work port in fluid communication with the actuator. The system can also be provided with an electronic controller configured to generate a hydraulic circuit fluid leak signal when a flow error value integrated over time exceeds a total flow error threshold value. In one aspect, the flow error value can be calculated by subtracting a proportional flow rate difference from a predetermined margin value. In another aspect, the proportional flow rate difference can be calculated by subtracting a first hydraulic fluid flow rate representing fluid flowing from the first work port to the fluid actuator from a second hydraulic fluid flow rate representing fluid flowing to the second work port from the fluid actuator.

The hydraulic system can also include a plurality of hydraulic work circuits wherein the control valve assembly has a plurality of work sections, in one aspect, each work section can be associated with the fluid actuator of one of the plurality of hydraulic work circuits. In one aspect, each work section can have a first work port in fluid communication with the fluid actuator associated with the work section and a second work port in fluid communication with the fluid actuator associated with the work section. The electronic controller can also be configured to generate a hydraulic circuit fluid leak signal when a leak is detected in any one of the work circuits. In such an implementation, the fluid leak signal can be generated when the flow error value integrated over time exceeds the total flow error threshold value, as described above.

DESCRIPTION OF THE DRAWINGS

Non-limiting and non-exhaustive embodiments are described with reference to the following figures, which are not necessarily drawn to scale, wherein like reference numerals refer to like parts throughout the various views unless otherwise specified.

FIG. 6 is a process flow chart showing a third leak detection and isolation protocol for use in the process shown in FIG. 3.

DETAILED DESCRIPTION

Figure 1:
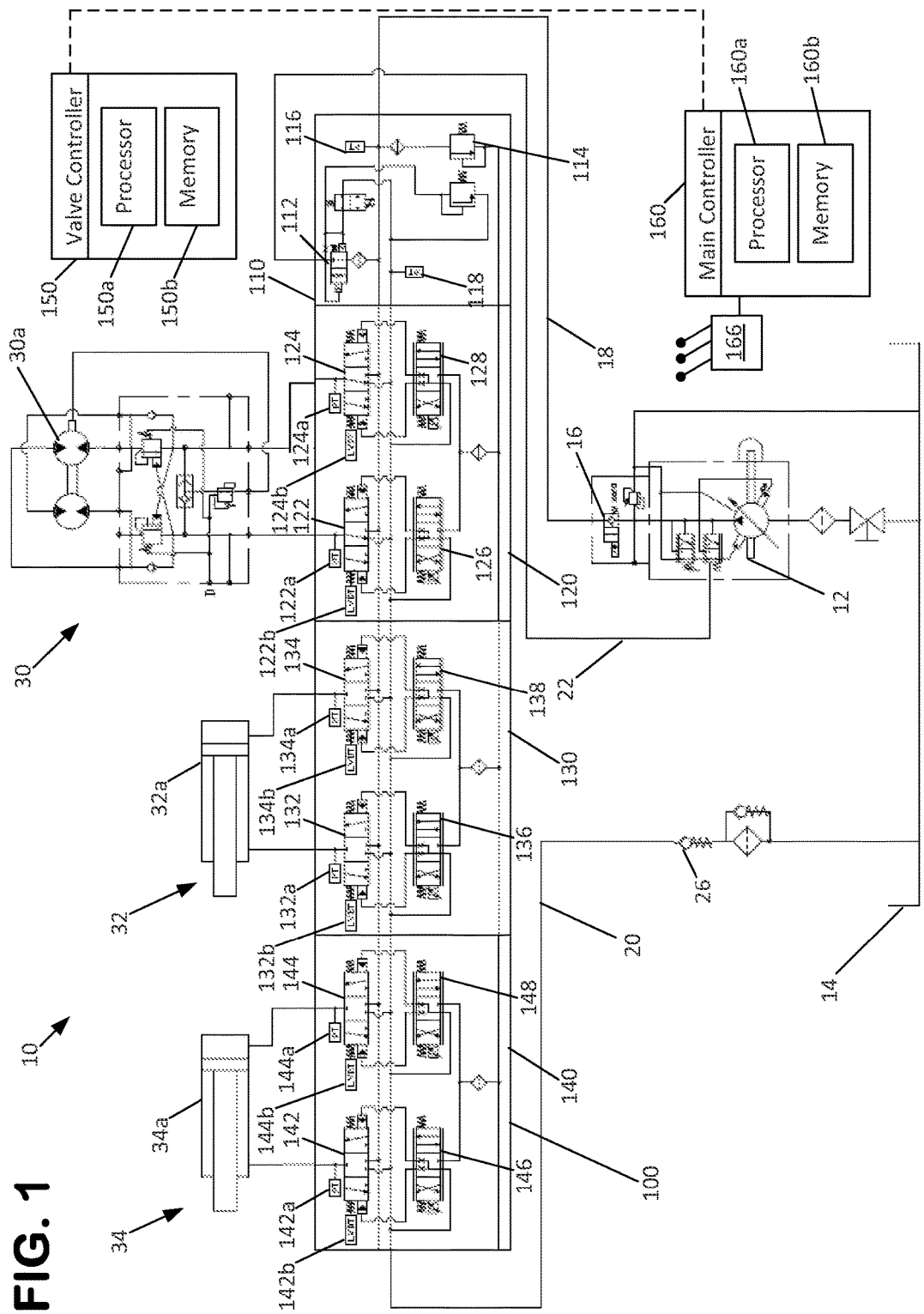
FIG. 1 is a schematic view of a first embodiment hydraulic system having features that are examples of aspects in accordance with the principles of the present disclosure.

Various embodiments will be described in detail with reference to the drawings, wherein like reference numerals represent like parts and assemblies throughout the several views. Reference to various embodiments does not limit the scope of the claims attached hereto. Additionally, any examples set forth in this specification are not intended to be limiting and merely set forth some of the many possible embodiments for the appended claims.

Hydraulic System Description

Referring to FIG. 1, a hydraulic system 10 is illustrated as a schematic diagram. Hydraulic system 10 may be part of a vehicle system, for example, a fork lift or a telehandler. As shown, hydraulic system 10 includes a pump 12 configured to provide pressurized fluid to at least one control valve assembly 100, in the embodiment shown, pump 12 is shown as a variable displacement axial pump with a primary shut off valve 16. However, other types of pumps may be used for pump 12, such as an over-center pump. As configured, the hydraulic pump 12 includes an inlet (i.e., a low pressure side) that receives hydraulic fluid from a reservoir 14, and the hydraulic pump 12 includes an outlet a high pressure side) that is connected to the control valve assembly 100 via supply line 18. When the pump 12 is rotated, hydraulic fluid is drawn from the reservoir 14 into the inlet of the hydraulic pump 12 and expelled from the outlet of the hydraulic pump 12 at a higher pressure. Fluid is returned from the control valve assembly 100 by a reservoir line. In the embodiment shown, the output flow of the pump 12 is controlled by a load-sense line 22 extending from the control valve assembly 100. Fluid is returned to the reservoir 14 via return line 20 where a spring check valve 26 may be installed to maintain a nominal back pressure in the return line 20.

Still referring to FIG. 1, the control valve assembly 100 is shown as being a multi-section valve configured to provide selective operational control to a number of work circuits. As shown, control valve assembly 100 is a two-stage control valve assembly, such as an Ultronics® ZTS16 Integrated Proportional Control Valve manufactured by Eaton Corporation of Cleveland, Ohio. An example of a two-stage or twin spool valve is disclosed in U.S. Pat. No. 8,239,069 to Yuan et al., filed Jun. 11, 2009, which is incorporated herein by reference in its entirety. However, it is noted that other types of valves may be used without departing from the concepts presented herein. In the embodiment shown, control valve assembly includes three work sections 120, 130, 140 corresponding to three work circuits 30, 32, and 34. Although three work circuits are shown, more or fewer work circuits may be associated with control valve assembly 100. As shown, work circuit 30 includes a hydraulic motor system 30a, work circuit 32 includes a double acting hydraulic actuator 32a, and work circuit 40 includes a double acting hydraulic actuator. It should be understood that other types of work circuits may operated by control valve assembly 100.

As shown, the first work section 120 includes a first proportional valve 122 and a second proportional valve 124 configured to selectively control flow to and from the work circuit 30. The position of the first proportional valve 122 may be controlled by a first pilot valve 126 while the position of the second proportional valve 124 may be controlled by a second pilot valve 128, wherein the position of the first and second pilot valves 126, 128 may be controlled by an electronic signal from a valve controller 150 or a main controller 160 (discussed later). In the embodiment shown, pressure sensors 122a, 124a are provided at the outlets of the first and second proportional valves 122, 124, respectively. Position sensors 122b, 124b, which may be linear variable differential transformer (LVDT) position sensors, are also shown as being provided for the first and second proportional valves 122, 124, respectively.

As shown, the second work section 130 includes a first proportional valve 132 and a second proportional valve 134 configured to selectively control flow to and from the work circuit 32. The position of the first proportional valve 132 may be controlled by a first pilot valve 136 while the position of the second proportional valve 134 may be controlled by a second pilot valve 138, wherein the position of the first and second pilot valves 136, 138 may be controlled by an electronic signal from a valve controller 150 or a main controller 160 (discussed later). In the embodiment shown, pressure sensors 132a, 134a are provided at the outlets of the first and second proportional valves 132, 134, respectively. Position sensors 132b, 134b, which may be LVDT position sensors, are also shown as being provided for the first and second proportional valves 132, 134, respectively.

As shown, the third work section 140 includes a first proportional valve 142 and a second proportional valve 144 configured to selectively control flow to and from the work circuit 34. The position of the first proportional valve 142 may be controlled by a first pilot valve 146 while the position of the second proportional valve 144 may be controlled by a second pilot valve 148, wherein the position of the first and second pilot valves 146, 148 may be controlled by an electronic signal from a valve controller 150 or a main controller 160 (discussed later). In the embodiment shown, pressure sensors 142a, 144a are provided at the outlets of the first and second proportional valves 142, 144, respectively. Position sensors 142b, 144b, which may be LVDT position sensors, are also shown as being provided for the first and second proportional valves 142, 144, respectively.

The control valve assembly 100 is also shown as having a valve control section 110. As shown, valve control section 110 is configured with a load-sense valve 112 that provides a load-sense signal to control the output of pump 12 via load-sense line 22 such that the pump output matches the flow requirements of the work circuits 30, 32, 34. Valve control section 110 is also provided with a pilot pressure reducing valve for reducing fluid pressure to an acceptable range for controlling the position of the proportional valves 122, 124, 222, 224, 232, 234. A supply pressure sensor 116 and a return pressure sensor 118 are also shown as being provided in valve control section 110.

Figure 2:
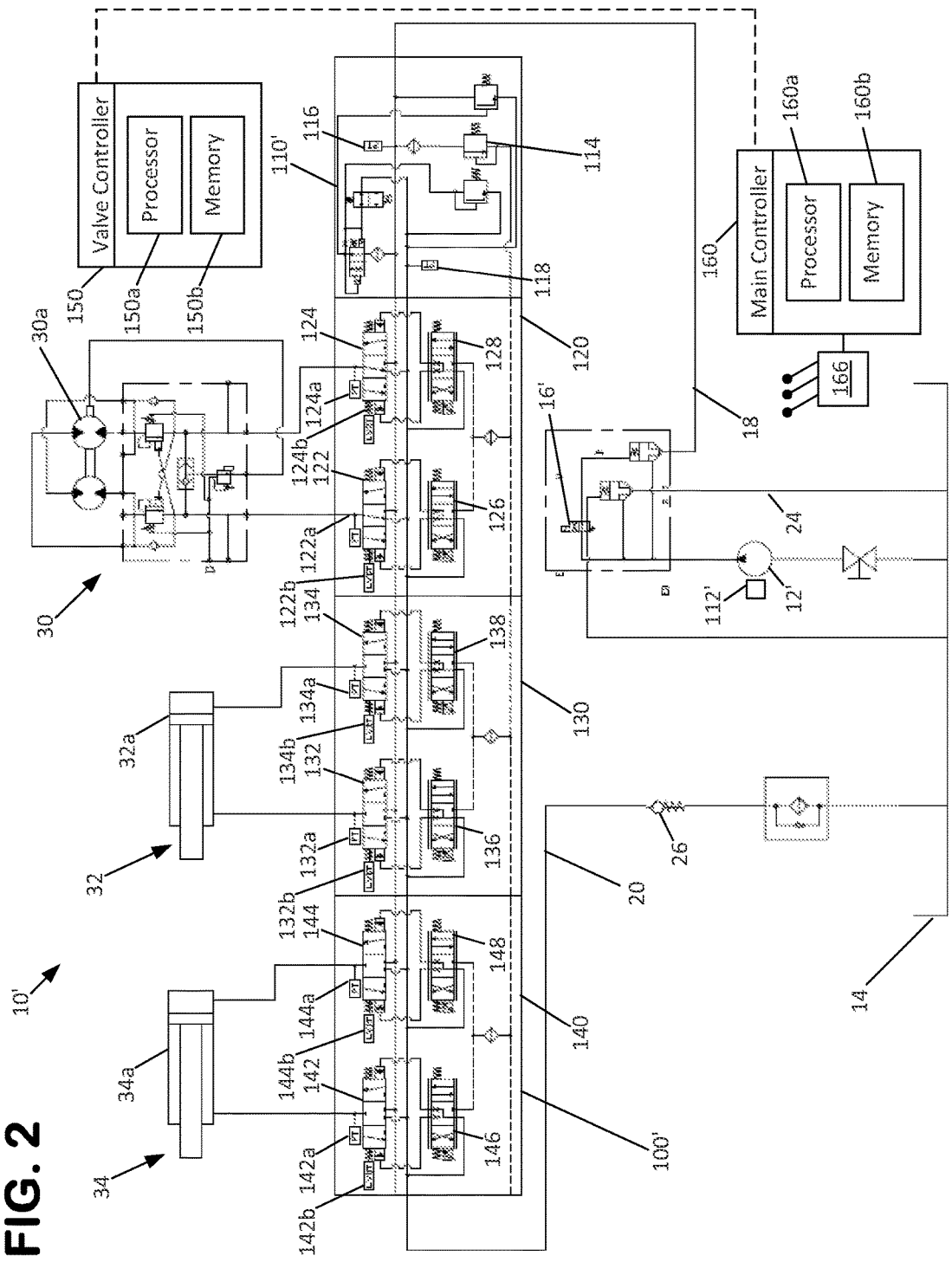
FIG. 2 is a schematic view of a second embodiment hydraulic system having features that are examples of aspects in accordance with the principles of the present disclosure.

Referring to FIG. 2, a second embodiment of a hydraulic system 10' involving a fixed displacement pump 12' is presented. As many of the concepts and features are similar to the first embodiment shown in FIG. 1, the description for the first embodiment is hereby incorporated by reference for the second embodiment. Where like or similar features or elements are shown, the same reference numbers will be used where possible. The following description for the second embodiment will be limited primarily to the differences between the first and second embodiments.

The hydraulic system 10' is shown as having a valve control assembly 100' with a valve control section 110'. The work sections 120, 130, 140 of the second embodiment are shown as being the same as the first embodiment. However, the valve control section 110' in the second embodiment does not include a load-sense valve. Instead a pump speed sensor 112' is utilized in conjunction with a bypass valve 16', in fluid communication with the reservoir 14 via line 24, to control the output flow of the pump 12'.

Electronic Control System

The hydraulic system 10 or 10' operates in various modes depending on demands placed on the work machine (e.g., by an operator). A control system may be provided to implement the operating modes of the hydraulic circuit 10, 10'. In the embodiment shown, a valve controller 150 and a main controller 160 are shown as being in electronic communication with each other and with the various control components in the system 10, 10'. However, it should be understood that a single controller could be used to execute the operation of the hydraulic system 10, 10' and also understood that a larger number of controllers may be used. Furthermore, it should also be understood that where multiple control valve assemblies 100 are used in a system 100, 100' that a single main controller 160 may be provided in addition to a plurality of valve controller 150.

The electronic controllers 150, 160 are schematically shown as including a processor 150a, 160a and a non-transient computer readable storage medium or memory 150b, 160b such as RAM, flash drive or a hard drive. Memory 150b, 160b is for storing program instructions or executable code, the operating parameters, and the input from the operator user interface while processor 150a, 160a is for executing the code. The electronic controller 150, 160 typically includes at least some form of memory 150b, 160b. Examples of memory 150b, 160b include computer readable media. Computer readable media includes any available media that can be accessed by the processor 150a, 160a. By way of example, computer readable media include computer readable storage media and computer readable communication media.

Computer readable storage media includes volatile and nonvolatile, removable and non-removable media implemented in any device configured to store information such as computer readable instructions, data structures, program modules or other data. Computer readable storage media includes, but is not limited to, random access memory, read only memory, electrically erasable programmable read only memory, flash memory or other memory technology, compact disc read only memory, digital versatile disks or other optical storage, magnetic cassettes, magnetic tape, magnetic disk storage or other magnetic storage devices, or any other medium that can be used to store the desired information and that can be accessed by the processor 50A.

Computer readable communication media typically embodies computer readable instructions, data structures, program modules or other data in a modulated data signal such as a carrier wave or other transport mechanism and includes any information delivery media. The term "modulated data signal" refers to a signal that has one or more of its characteristics set or changed in such a mariner as to encode information in the signal. By way of example, computer readable communication media includes wired media such as a wired network or direct-wired connection, and wireless media such as acoustic, radio frequency, infrared, and other wireless media. Combinations of any of the above are also included within the scope of computer readable media.

Electronic controller 150 is also shown as having a number of inputs and outputs that may be used for implementing the operation of the hydraulic system 10, 10'. For example, controller 150 may be configured to receive inputs from the position sensors 122b, 124b, 132b, 134b, 142b, and 144b and inputs from the pressure sensors 122a, 124a, 132a, 134a, 142a, 144a, 116, and 118. The electronic controller 150 may also be configured to receive inputs from the main controller 160, such as flow demand signals for each of the work sections 120, 130, 140. The electronic controller 150 may also be configured to send outputs to a variety of components, such as the pilot control valves 126, 128, 136, 138, 146, 148, the load-sense valve 112, and the main controller 160. Controller 150 may also be configured to pass any operational data through to the main controller 160.

Electronic controller 160 is also shown as having a number of inputs and outputs that may be used for implementing the operation of the hydraulic system 10, 10'. For example, controller 160 may be configured to receive inputs from a human-to-machine interface 166 and to send outputs to main shut off valve 16, pump 12', bypass valve 16' The electronic controller 150 may also be configured to receive inputs from the main controller 160, such as flow demand signals for each of the work sections 120, 130, 140. The electronic controller 160 may also be configured to send outputs to the valve controller 150 and pass operational data through to the valve controller 150.

Method of Operation

Referring to FIGS. 3-7, a method 1000 of operating the hydraulic system 10 is shown. It is noted that although FIGS. 3-7 diagrammatically show the method steps in a particular order, the method is not necessarily intended to be limited to being performed in the shown order. Rather at least some of the shown steps may be performed in an overlapping manner, in different order and/or simultaneously. Furthermore, it is noted that any or all of the steps disclosed in relation to method 1000 may be performed on controller 150 alone, controller 160 alone, apportioned between controllers 150 and 160, or apportioned among other additional controllers. Furthermore, it is noted that the method 1000 may be carried out over a number of hydraulic systems simultaneously and is not limited to being implemented only in configurations where there is a one to one relationship between a pump and a control valve assembly. Additional controllers may be used as well.

Figure 3:
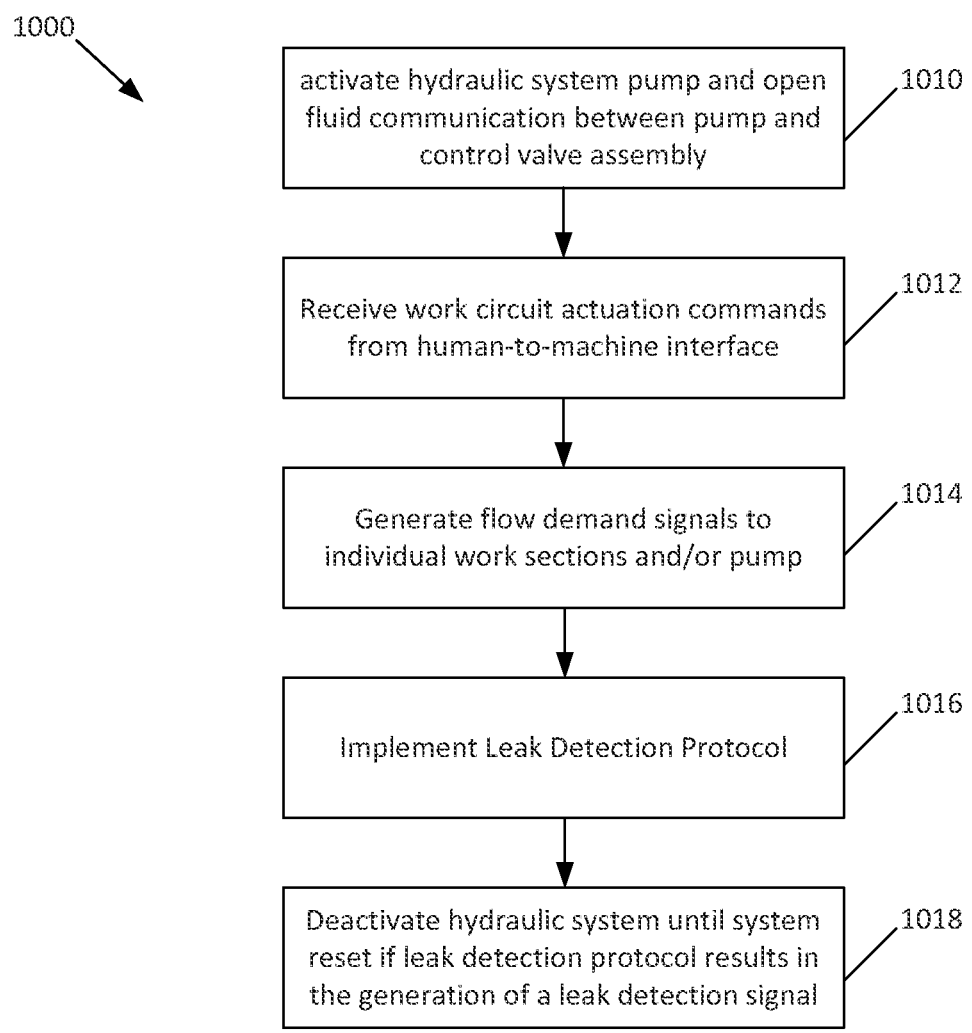
FIG. 3 is a process flow chart showing a method of operation of either of the hydraulic systems shown in FIGS. 1 and 2.

Referring to FIG. 3, a first step 1010 is shown as activating the hydraulic system pump and opening fluid communication between the pump and the control valve assembly. Where a main shut-off valve is provided between the pump and control valve assembly, this step may include opening the main shut-off valve. Where a bypass valve is provided between the pump and control valve assembly, this step may include positioning the bypass valve to direct fluid to the control valve assembly.

A second step 1012 is shown as receiving work circuit actuation commands from a human-to-machine interface, such as interface 166. This interface may be a combination of levers associated with the various work circuits, for example, lift, extend, side-shift, and tilt levers. In a step 1014, flow demand signals are generated to the pump and/or the individual work sections. In one embodiment, either of the valve controller and main controller can proportion the flow to the work sections where the sum of the total flow demand signals exceeds the capacity of the pump.

In a step 1016, a leak detection protocol is initiated. The leak detection protocol may include one or more of the leak detection protocols 1100, 1200, 1300, 1400 outlined in FIGS. 4-7, described below. In a step 1018, the hydraulic system is deactivated until system reset if the leak detection protocol step 1016 results in the generation of a leak detection signal. Step 1018 may include deactivating the entire hydraulic system, for example by commanding the pump to a zero flow state and isolating the pump from the control valve assembly. Step 1018 may also include deactivating only a portion of the hydraulic system, for example by commanding an individual work section to a zero flow state and isolating the associated work circuit from the rest of the hydraulic system.

First Leak Detection Protocol

Figure 4:
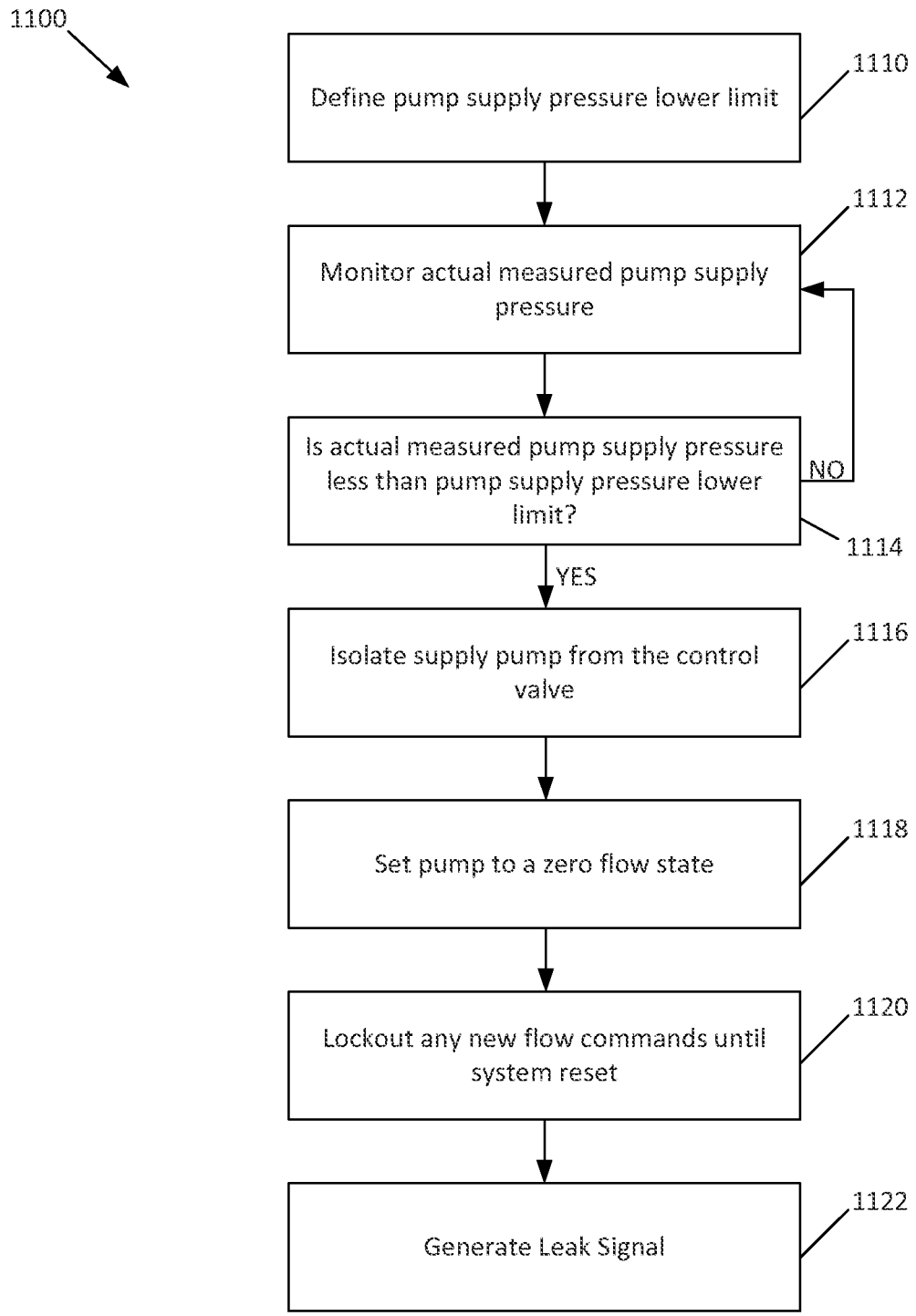
FIG. 4 is a process flow chart showing a first leak detection and isolation protocol for use in the process shown in FIG. 3.

Referring to FIG. 4, a first leak detection protocol 1100 is disclosed. First leak detection protocol 1110 is for detecting a leak in the hydraulic system between the pump and the control valve assembly. In a step 1110, a supply pressure lower limit is defined. In a step 1112, an actual measured pump supply pressure is monitored. In one embodiment the pump supply pressure may be monitored at pressure sensor 116 via value controller 150. In a step 1114, the actual measured pump supply pressure is compared to the pump supply pressure lower limit. If the measured value is equal to or above the lower limit, then the protocol 1100 returns to step 1112 for continued monitoring. If the measured value is below the lower limit, which would be indicative of a leak, for example in line 18, the protocol 1100 proceeds to step 1116 wherein the supply pump is isolated from the control valve. Where a main shut-off valve is provided, such as valve 16 shown in FIG. 1, step 1116 can include closing the valve 16 to isolate the pump 12 from the control valve assembly 100. Where a bypass valve is provided, such as valve 16' shown in FIG. 2, step 1116 can include moving the bypass valve 16' to a bypass state where fluid from pump 12 is directed to reservoir 14 via line 24 and the fluid in the control valve assembly 100' is thereby isolated from the pump 12. In the embodiment shown, the command to valves 16, 16' is sent by the main controller 160 which receives the pressure data from sensor 116 via controller 150. In a step 1118, the pump is set to a zero flow state while in a step 1120 any new flow commands to the pump from controllers 150, 160 are locked out until a system reset has occurred. In a step 1122, a leak signal is generated. It is noted that steps 1116, 1118, 1120, and 1122 may be performed simultaneously by the controller(s) 150, 160, or in a sequential fashion.

Figure 4A:
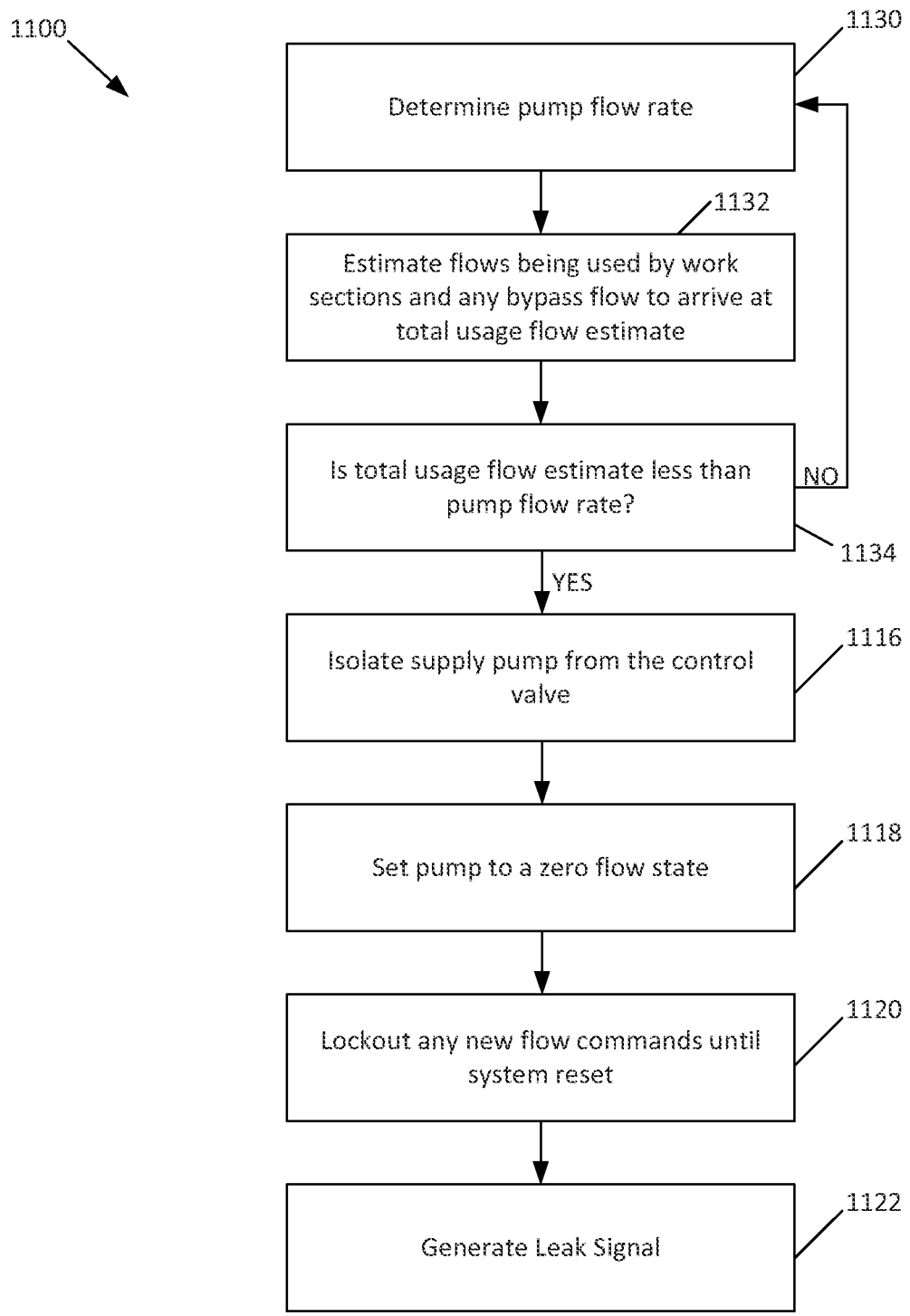
FIG. 4A is a process flow chart showing additional and/or alternative steps of the first leak detection and isolation protocol shown in FIG. 4.

The first leak detection protocol 1100 may additionally include steps to detect a leak, between the pump and the control valve assembly 100, that does not require the reliance upon a pump supply pressure lower limit threshold, as shown at FIG. 4A. While steps 1110 to 1114 will detect a relatively large leak in the system, a relatively small leak could still go undetected as long as the pump 12 is still able to maintain pressure above the pump supply pressure lower limit. Accordingly, the addition of the steps shown at FIG. 4A can operate in parallel with the steps in FIG. 4 to provide broader leak detection capabilities. Referring to step 1130, the pump flow rate is determined. In the case of a load sense pump controller (e.g. see FIG. 1), the valve control section 110 can detect when the pump is outputting its full flow, for example by comparing the measured supply pressure to the measured load sense pressure. In the case of a fixed displacement pump controller (e.g. see FIG. 2), the pump flow rate is known and the valve control section 110 can detect how much flow is going through the valve control section 110 in addition to how much flow is bypassing the valve control section 110 (e.g. via the bleed valve 16'). Such an estimation can be performed for each valve and bypass section (if present) at step 1132 where a total usage flow estimate is derived. At a step 1134, the total usage flow estimate is compared to the pump flow rate. Where the total usage flow estimate is equal to the pump flow rate within an acceptable margin, the control loop can be returned to step 1130. Where the total usage flow estimate is less than the pump flow rate outside of an acceptable margin, steps 1116 to 1122 can be implemented, as previously described above. This error could also be integrated to derive a total volume spilled estimate as well.

As mentioned previously, the protocol steps 1130 to 1134 can be performed in parallel with protocol steps 1110 to 1114 such that a leak signal can be generated by either set of steps. Alternatively, the noted protocol steps performed in sequence such that both conditions at steps 1114, 1134 must be satisfied before generating a leak detection signal. Also, the protocol steps shown at FIG. 4A could be implemented in a system without implementing the differently shown steps of FIG. 4, and vice versa.

Second Leak Detection Protocol

Figure 5:
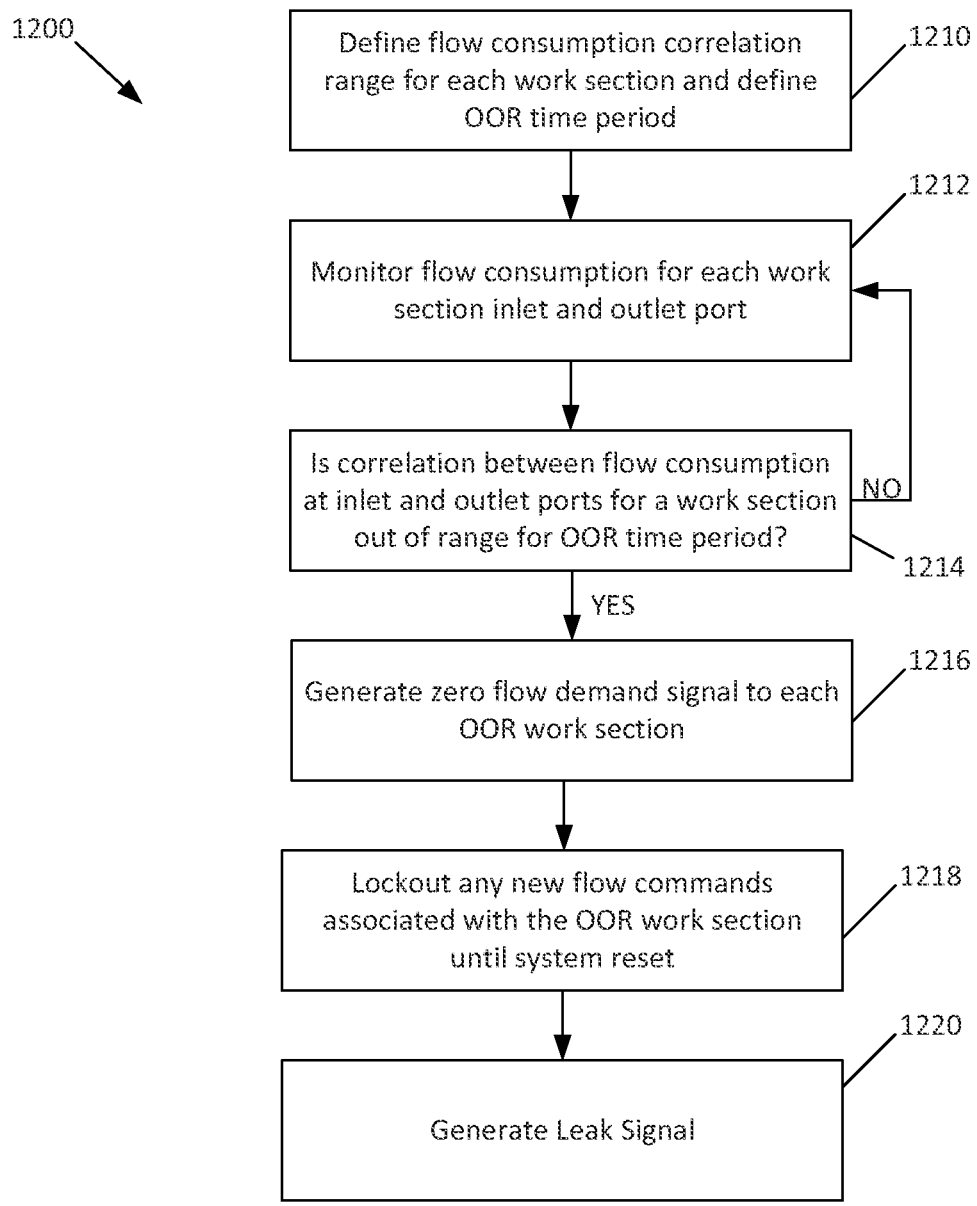
FIG. 5 is a process flow chart showing a second leak detection and isolation protocol for use in the process shown in FIG. 3.

Referring to FIG. 5, a second leak detection protocol 1200 is disclosed. Second leak detection protocol 1200 is for detecting a leak in the hydraulic system between the control valve assembly and one or more of the connected work circuits when the work circuit is in use. In a step 1210, a flow consumption correlation range for each work section is defined. Because an actuator or work circuit may have inlet and outlet flows that are not equal (e.g. because of different cylinder ratios and inefficiencies), a comparison between an actual correlation and a measured correlation between the two flows can be utilized to detect a leak. Step 1210 is also shown as defining an out of range (OOR) time period for establishing a minimum duration of a fault condition before a leak signal is generated. In step 1212, flow consumption for each work section inlet and outlet port is monitored. In the embodiment shown, controller 150 monitors pressure sensors 122a, 124a, 132a, 134a, 142a, and 144a for this purpose. In a step 1214 the measured correlation between associated inlet and outlet ports for each work section is compared to the flow consumption correlation range for that work section. Where the measured correlation is less than or equal to a predetermined correlation range or margin, the protocol 1200 returns to step 1212. Where the measured correlation is more than the predetermined correlation range or margin, which would be indicative of a leak in the work circuit, the protocol 1200 proceeds to step 1218. In step 1218, the out of range work section is set to a zero flow condition and locked out from receiving any new flow commands until system reset while step 1120 includes the generation of a leak detection signal. Unlike leak detection protocol 1100, protocol 1200 allows the hydraulic system to at least be partially operative by isolating only those work sections for which a leak is detected. Accordingly, protocol 1200 will continually monitor all active work sections even if a leak signal has been generated for one or more of the other work sections. It is noted that steps 1216, 1218, and 1220 may be performed simultaneously by the controller(s) 150, 160, or in a sequential fashion.

Figure 5A:
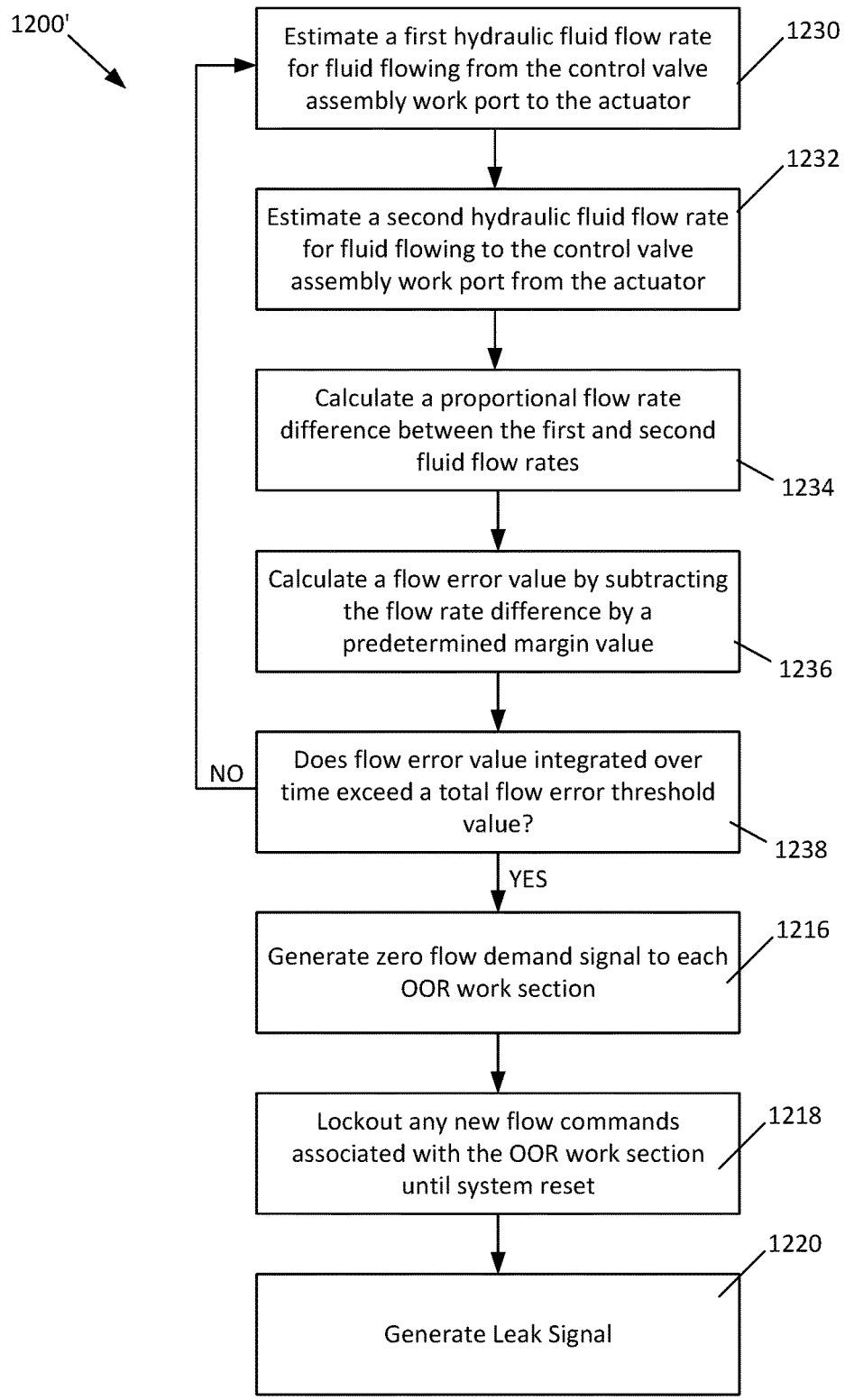
FIG. 5A is a process flow chart showing additional and/or alternative steps of the first leak detection and isolation protocol shown in FIG. 5.

FIG. 5A shows one example of the implementation of the second leak detection protocol 1200' for a control valve assembly in which the leak signal is generated based on reaching a calculated threshold volume of fluid leakage, as explained herein. In a step 1230, a first hydraulic fluid flow rate is estimated for fluid flowing from the control valve assembly first work port to the actuator. In a step 1232, a second hydraulic fluid flow rate is estimated for fluid flowing from the actuator to the control valve assembly second work port. In a step 1234, a proportional flow rate difference is calculated between the first and second hydraulic fluid flow rates. It is noted that step 1234 accounts for differences in flow volume of opposite sides of the actuator that might exist, for example a difference that would exist with the presence of a cylinder rod in the case where a linear actuator is utilized. In a step 1236, a flow error value is calculated by subtracting the flow rate difference from a predetermined margin value.

In a step 1238, the flow error value is integrated over time and compared to a total flow error threshold value. Where the integrated flow error value, which is essentially a representation of the total leaked volume of hydraulic fluid, exceeds a total flow error threshold value, steps 1216 to 1220 can be implemented, as explained above. It is noted that the integration of the flow error value at step 1238 could be limited to only integrating values above a certain threshold.

In one aspect, protocol 1200' can be used in conjunction with a twin spool valve assembly or two-stage valve in which step 1230 is performed by estimating the first hydraulic fluid flow rate for fluid flowing between a first stage of the control valve assembly and the actuator via the first work port and step 1232 is performed by estimating a second hydraulic fluid flow rate includes estimating the second fluid flow rate for fluid flowing between a second stage of the control valve assembly and the actuator via the second work port. In one aspect, the first and second stages of the control valve assembly are provided in a common housing body.

In one aspect, the estimating steps 1230 and 1232 can be performed when one of the first and second control valve stages is controlled to meet a hydraulic fluid pressure set point (i.e. pressure control) and the other of the first and second stages of the control valve assembly is controlled to meet a hydraulic fluid flow rate set point (i.e. flow control), depending upon the operating conditions of the work circuit. This approach may be accomplished by using a first pressure sensor and a first position sensor associated with the first stage of the control valve assembly and a second pressure sensor and a second position sensor associated with the second stage of the control valve assembly. In one embodiment, the valve stages are configured such that the valve associated with the loaded side of the actuator is placed in a flow control configuration while the valve associated with the non-loaded side of the actuator is placed in a pressure control configuration. The pressure control loop can be configured as an outer loop with an inner flow and position controller loop, wherein the output of the pressure controller is a flow demand.

It is noted that when the cylinder rod of the actuator reaches the end of the stroke and is no longer moving, the upstream side valve will transition into a pressure control mode. In this position, the flow equations will not be effective in diagnosing a leak. However, any flow above a small threshold amount on the upstream side of the actuator will indicated a leak fault. Additionally, although a downstream leak cannot be detected at the end stop, the actuator will at least block any fluid from spilling in this case.

Third Leak Detection Protocol

Referring to FIG. 6, a third leak detection protocol 1300 is disclosed. The third leak detection protocol 1300 is for detecting a leak in the hydraulic system between the control valve assembly and one or more of the connected work circuits when the work circuit is in a zero flow state. In a step 1310, a zero flow state differential pressure change limit is defined, as is an out of range time period. In a step, 1312, a work section is closed to achieve a zero flow state. In a step 1314, port pressures at each closed work section are recorded and a differential pressure between the inlet and outlet of each work section is calculated. In the embodiment shown, controller 150 monitors pressure sensors 122a, 124a, 132a, 134a. 142a, and 144a for this purpose. In a step 1316, the differential pressure between each inlet and outlet port for each work section is monitored. Where the difference between the monitored and recorded differential pressures is less than or equal to the change limit, the protocol returns to step 1316 for continued monitoring. Where the difference between the monitored and recorded differential pressures is equal to or greater than the change limit for the out of range time period, the protocol proceeds to step 1320. At step 1320, the out of range work section is set to a zero flow condition and locked out from receiving any new flow commands until system reset while step 1322 includes the generation of a leak detection signal. Similar to leak detection protocol 1200, protocol 1300 allows the hydraulic system to at least be partially operative by isolating only those work sections for which a leak is detected. Accordingly, protocol 1300 will continually monitor all active work sections even if a leak signal has been generated for one or more of the other work sections. It is rioted that steps 1320 and 1322 may be performed simultaneously by the controller(s) 150, 160, or in a sequential fashion.

Figure 6A:
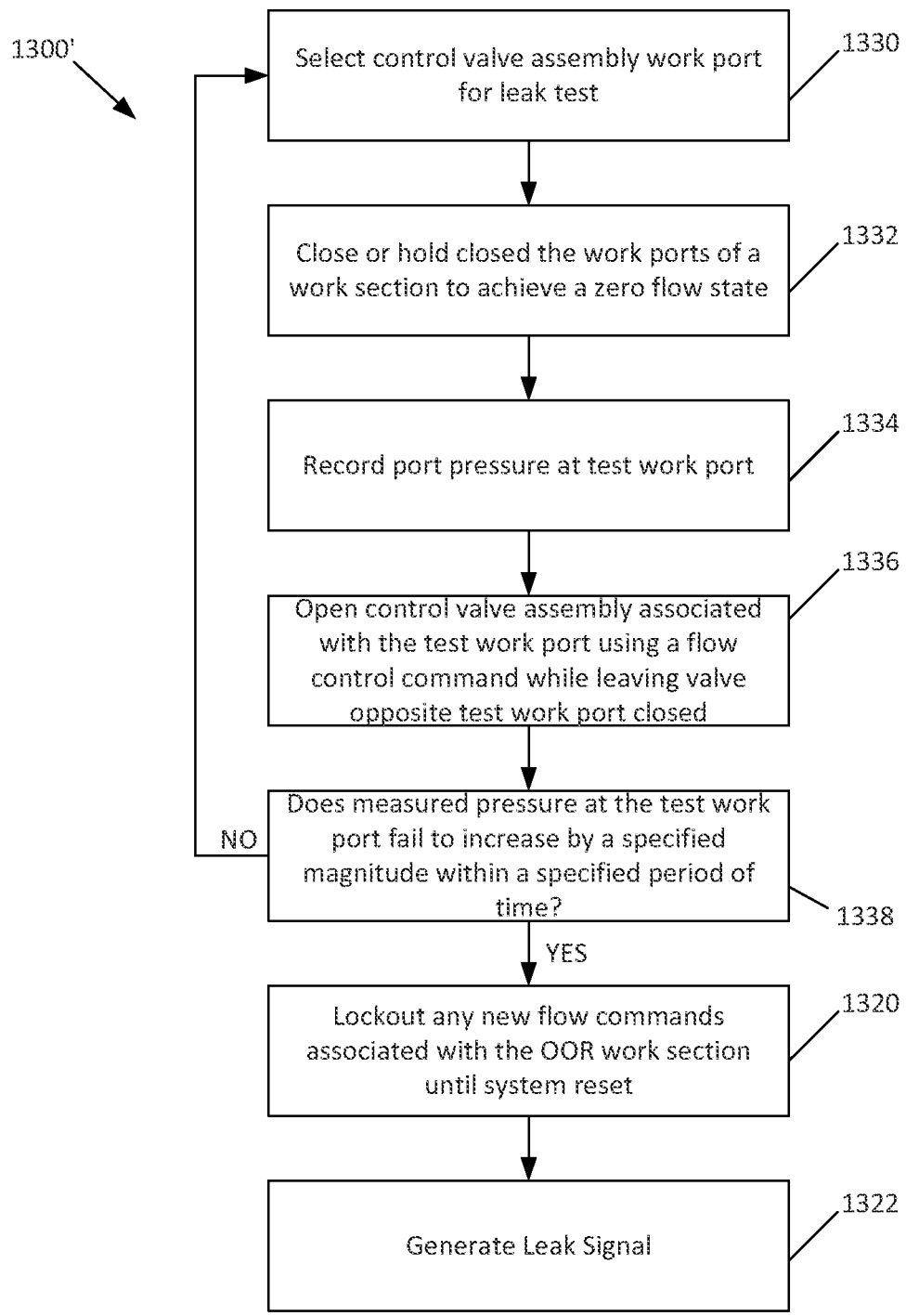
FIG. 6A is a process flow chart showing additional and/or alternative steps of the first leak detection and isolation protocol shown in FIG. 6.

Referring to FIG. 6A, an alternative approach to the third leak detection protocol 1300' is shown in which a valve assembly can be tested without moving a service. It is noted that protocol 1300" can be performed on any control valve assembly or work section that is not currently in use while the remaining work sections of the system can remain in service. In a step 1330, a control valve assembly and associated work port is selected for testing. In one aspect, the control valve work port can be identified and selected for testing when a measured pressure at the first or second work port associated with a closed first or second stage is below a low pressure threshold value. In a step 1332, the control valve assembly first and second stages are closed or held closed while in a step 1334 the work port pressure at the test work port is measured and recorded. If the test work port is already closed and there is a residual pressure present, then it can be determined that a leak likely does not exist at the test work port. In a step 1336, the control valve assembly (e.g. the first or second stage) associated with the test work port is opened using a flow control command to inject fluid into the test work port. By using a flow control approach (in contrast to a pressure control approach), the extent of fluid leakage can be minimized during the check if there is a burst hose. In a step 1338, it is determined whether the measured pressure at the test work port increases by a specified magnitude within a specified period of time. Where the pressure does not increase satisfactorily, steps 1320 to 1322 can be performed as described above, as such an occurrence is indicative of a fluid leak. Where the pressure does increase satisfactorily, the protocol can return to step 1330.

It is noted that, since one work port is always closed during testing under protocol 1300', the test can be entirely performed without moving the service which allows for more consistent pressure thresholds and continued use of the work machine. Additionally, since residual pressures are not relied upon, the protocol 1300' does not require that the control valve assembly have been in use recently. Furthermore, protocol 1300' additionally provides a method for monitoring a supply pressure leak in that if the pump cannot achieve a requested pressure where none of the other services are active, it can be ascertained that the pump flow is going elsewhere and that a leak may likely exist.

Fourth Leak Detection Protocol

Figure 7:
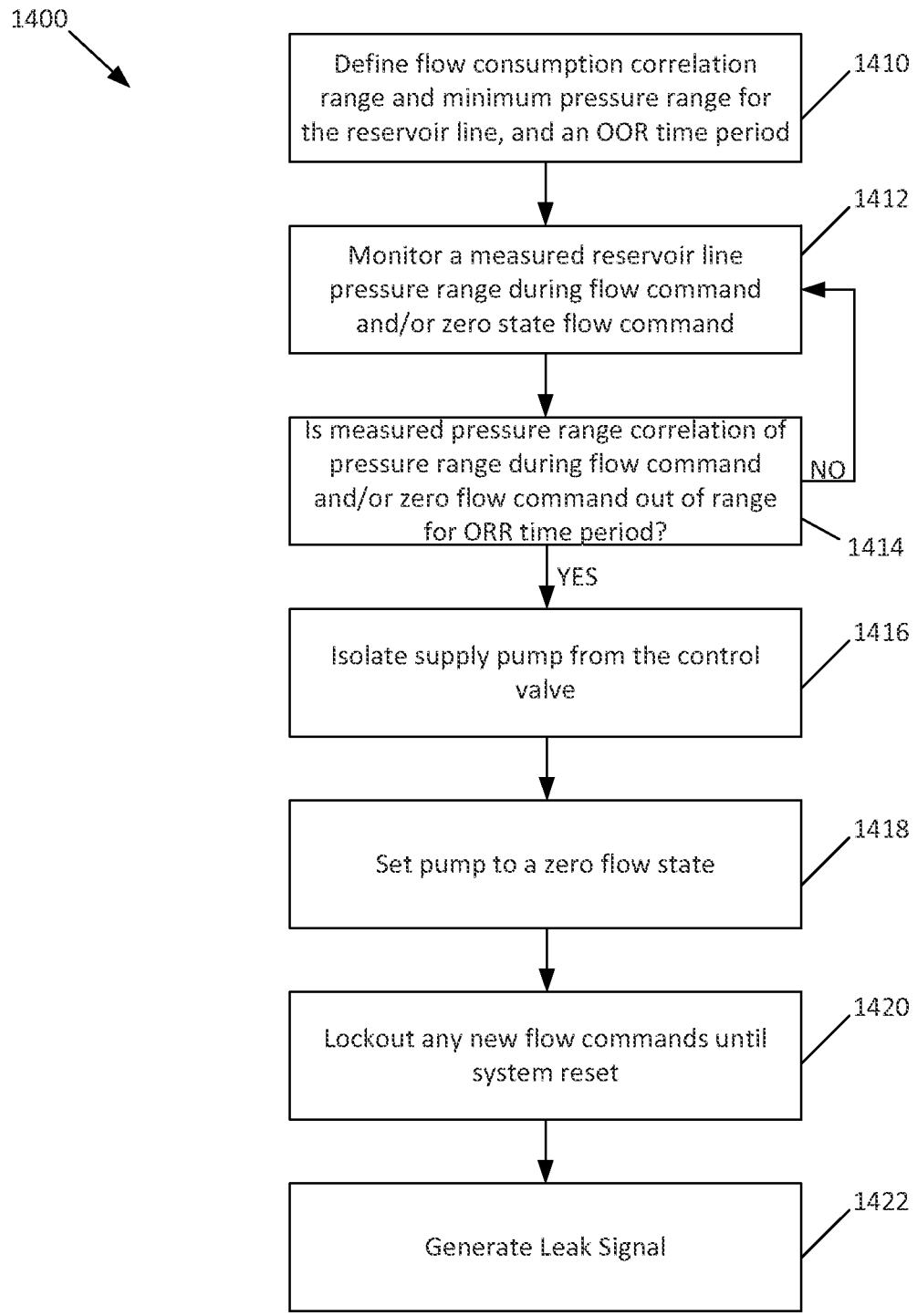
FIG. 7 is a process flow chart showing a fourth leak detection and isolation protocol for use in the process shown in FIG. 4.

Referring to FIG. 7, a fourth leak detection protocol 1400 is shown. Fourth leak detection protocol 1400 is for detecting a leak in the reservoir line between the control valve assembly and the reservoir. In a step 1410 of protocol 1400 a flow consumption correlation range and minimum pressure range for the reservoir line are defined, as is an out of range time period. In a step 1412, the reservoir line pressure range is monitored when there is a flow command or a zero flow state. As the check valve 26 provides a back pressure to the reservoir line, a minimum pressure in the line, for example at pressure sensor 118, would normally be anticipated. Where the pressure falls below the nominal back pressure required by the check valve 26, a leak can be expected to have occurred. Additionally, during a flow state the correlation between the supply flow and the return flow can be monitored against a calculated correlation range to ensure that a leak also has not occurred. These comparisons are shown at step 1414, where the protocol 1400 returns to step 1412 for continued monitoring if the measured state is within the correlation range and above the minimum pressure range. Where the monitored and measured values are outside of the set ranges for the out of range time period, a leak in the reservoir line is detected and the pump is isolated from the control valve assembly at a step 1416 in a manner similar to that described for step 1116 the first leak detection protocol 1100. The reservoir line pressure may also be low if the machine has not put any flow into the reservoir line yet (i.e. the reservoir line has not yet been charged) or if one of the actuator pressures drops below reservoir pressure and takes fluid out of the reservoir line. These conditions are can be detected with the pressure sensors at the valves to prevent false leak detections.

In a step 1418, the pump is set to a zero flow state while in a step 1420 any new flow commands to the pump from controllers 150, 160 are locked out until a system reset has occurred. In a step 1422, a leak signal is generated. It is noted that steps 1416, 1418, 1420, and 1422 may be performed simultaneously by the controller(s) 150, 160, or in a sequential fashion.

Where a hydraulic system is configured to implement all four of the leak detection protocols 1100 to 1400, the system can be protected from a leak in the main supply line between the pump and the control valve assembly, from a leak in the reservoir return line between the reservoir and the control valve assembly, and from a leak in any of the individual work circuits regardless of whether the work circuits are being used or not. Furthermore, the system can be configured to isolate the leak in the system once detected in a very small amount of time, for example a few milliseconds, thus minimizing any oil spill. Additionally, the controller 150 and/or 160 can be configured to take into account differences in cylinder ratios and inefficiencies in the actuators such that the leak detection protocols are optimized. Accordingly, the disclosed system will operate to significantly limit the volume of leaked hydraulic fluid should a leak in the system occur.

The various embodiments described above are provided by way of illustration only and should not be construed to limit the claims attached hereto. Those skilled in the art will readily recognize various modifications and changes that may be made without following the example embodiments and applications illustrated and described herein, and without departing from the true spirit and scope of the disclosure.

What is claimed is:

1. A method for detecting a leak in a hose of a hydraulic system having a control valve assembly with first and second work ports in fluid communication with an actuator, the method comprising implementing a first leak detection protocol including the steps of:
   (a) estimating a first hydraulic fluid flow rate for fluid flowing from the control valve assembly first work port to the actuator;
   (b) estimating a second hydraulic fluid flow rate for fluid flowing from the actuator to the control valve assembly second work port;
   (c) calculating a proportional flow rate difference between the first and second hydraulic fluid flow rates;
   (d) calculating a flow error value by subtracting the proportional flow rate difference from a predetermined margin value; and
   (e) generating a hydraulic fluid leak signal when the flow error value integrated over time exceeds a total flow error threshold value.

2. The method for detecting a leak of claim 1, wherein:
   (a) the step of estimating a first hydraulic fluid flow rate includes estimating the first hydraulic fluid flow rate for fluid flowing between a first stage of the control valve assembly and the actuator via the first work port; and
   (b) the step of estimating a second hydraulic fluid flow rate includes estimating the second hydraulic fluid flow rate for fluid flowing between a second stage of the control valve assembly and the actuator via the second work port.

3. The method for detecting a leak of claim 2, wherein the first and second stages of the control valve assembly are provided in a common housing body.

4. The method for detecting a leak of claim 2, wherein:
   (a) one of the first and second stages of the valve assembly is controlled to meet a hydraulic fluid pressure set point and the other of the first and second stages of the control valve assembly is controlled to meet a hydraulic fluid flow rate set point.

5. The method for detecting a leak of claim 2, wherein:
   (a) the step of estimating a first hydraulic fluid flow rate includes using a first pressure sensor and a first position sensor associated with the first stage of the control valve assembly; and
   (b) the step of estimating a second hydraulic fluid flow rate includes using a second pressure sensor and a second position sensor associated with the second stage of the control valve assembly.

6. The method for detecting a leak of claim 2, further comprising:
   (a) implementing a second leak detection protocol when a measured pressure at the first or second work port associated with a closed first or second stage is below a low pressure threshold value to identify a test work port, the second leak detection protocol including the steps of:
      i. closing, or holding closed, the control valve assembly first and second stages;
      ii. recording a first starting work port pressure at the test work port;
      iii. opening the control valve assembly first or second stage associated with the test work port;

iv. generating a hydraulic fluid leak signal when the measured pressure at the test work port does not increase by a specified magnitude within a specified period of time.

7. The method for detecting a leak of claim 6, further comprising:
(a) implementing a third leak detection protocol when a total estimated flow rate for a plurality of control valve assemblies and any bypass flow is less than a total flow estimate for a pump associated with the plurality of control valve assemblies, the third leak detection protocol including the steps of:
 i. estimating a hydraulic fluid flow rate through each of the control valve assemblies;
 ii. estimating a hydraulic bypass flow rate for any fluid supplied by the pump and returned to a reservoir without passing through any of the plurality of control valve assemblies
 iii. estimating a pump flow rate;
 iv. calculate a total usage flow rate by summing the control valve assembly hydraulic fluid flow rates and the hydraulic fluid bypass flow rate;
 v. generating a hydraulic fluid leak signal when the total usage flow rate is less than the pump flow rate.

8. A hydraulic system comprising:
(a) a hydraulic circuit including:
 i. a fluid actuator;
 ii. a control valve assembly having first work port in fluid communication with the actuator and a second work port in fluid communication with the actuator; and
(b) an electronic controller configured to generate a hydraulic circuit fluid leak signal when a flow error value integrated over time exceeds a total flow error threshold value, wherein the flow error value is calculated by subtracting a proportional flow rate difference from a predetermined margin value, wherein the proportional flow rate difference is calculated by subtracting a first hydraulic fluid flow rate representing fluid flowing from the first work port to the fluid actuator from a second hydraulic fluid flow rate representing fluid flowing to the second work port from the fluid actuator.

9. The hydraulic system of claim 8, wherein the control valve assembly includes a first stage associated with the first work port and a second stage associated with the second work port.

10. The hydraulic system of claim 9, wherein the first and second stages of the control valve assembly are provided in a common housing body.

11. The hydraulic system of claim 9, wherein the electronic controller is configured to operate the control valve assembly such that one of the first and second control valve stages is controlled to meet a hydraulic fluid pressure set point and the other of the first and second stages is controlled to meet a hydraulic fluid flow rate set point.

12. The hydraulic system of claim 9, further comprising:
(a) a first fluid pressure sensor associated with the first stage of the control valve assembly, the first pressure sensor providing an input to the electronic controller;
(b) a first valve position sensor associated with the first stage of the control valve assembly, the first valve position sensor providing an input to the electronic controller;
(c) a second fluid pressure sensor associated with the second stage of the control valve assembly, the second pressure sensor providing an input to the electronic controller;
(d) a second valve position sensor associated with the second stage of the control valve assembly, the second valve position sensor providing an input to the electronic controller;
(e) wherein the electronic controller is configured to calculate the first hydraulic fluid flow rate based on inputs from the first fluid pressure sensor and the first valve position sensor and is configured to calculate the second hydraulic fluid flow rate based on inputs from the second fluid pressure sensor and the second valve position sensor.

13. The hydraulic system of claim 12, wherein:
(a) the first and second valve position sensors are LVDT-type sensors.

14. The hydraulic system of claim 12, wherein the control valve assembly is positioned by a pilot valve, wherein a position of the pilot valve is controlled by the electronic controller.

15. The hydraulic system of claim 12, wherein each of the first and second ports of the plurality of work sections is provided with a fluid pressure sensor and wherein each of the first and second stages is provided with a valve position sensor.

16. The hydraulic system of claim 13, wherein each of the first and second stages of the plurality of work sections is positioned by a pilot valve, wherein a position of the pilot valve is controlled by the electronic controller.

17. A hydraulic system comprising:
(a) a plurality of hydraulic work circuits, each including a fluid actuator;
(b) a control valve assembly having a plurality of work sections, each work section being associated with the fluid actuator of one of the plurality of hydraulic work circuits, each work section having a first work port in fluid communication with the fluid actuator associated with the work section and a second work port in fluid communication with the fluid actuator associated with the work section; and
(c) an electronic controller configured generate a hydraulic circuit fluid leak signal when a leak is detected in any of the work circuits, wherein for each work section:
 i. the fluid leak signal is generated when a flow error value integrated over time exceeds a total flow error threshold value;
 ii. the flow error value is calculated by subtracting a proportional flow rate difference from a predetermined margin value;
 iii. the proportional flow rate difference is calculated by subtracting a first hydraulic fluid flow rate representing fluid flowing from the first work port to the associated fluid actuator from a second hydraulic fluid flow rate representing fluid flowing to the second work port from the associated fluid actuator.

18. The hydraulic system of claim 17, wherein each of the plurality of work sections of the control valve assembly includes a first stage associated with the first work port and a second stage associated with the second work port.

19. The hydraulic system of claim 18, wherein the plurality of work sections of the control valve assembly are provided in a common housing body.

20. The hydraulic system of claim 19, wherein the electronic controller is configured to operate each work section of the control valve assembly such that one of the first and second control valve stages is controlled to meet a hydraulic fluid pressure set point and the other of the first and second stages is controlled to meet a hydraulic fluid flow rate set point.

* * * * *